United States Patent [19]
Ruof

[11] 3,724,902
[45] Apr. 3, 1973

[54] SKID DETECTOR CIRCUIT

[75] Inventor: Edgar J. Ruof, Akron, Ohio

[73] Assignee: The Goodyear Tire & Rubber Company, Akron, Ohio

[22] Filed: May 13, 1970

[21] Appl. No.: 36,936

[52] U.S. Cl. ......... 303/21 CG, 188/181 A, 244/111, 303/20, 303/21 BE
[51] Int. Cl. ............................................. B60t 8/12
[58] Field of Search ...188/181; 244/111; 303/20, 21; 324/162; 340/262

[56] References Cited

UNITED STATES PATENTS

| | | | |
|---|---|---|---|
| 3,499,689 | 3/1970 | Carp et al. | 303/21 P |
| 3,574,426 | 4/1971 | Ruof | 303/21 EB |
| 3,578,819 | 5/1971 | Atkins | 303/21 P UX |
| 3,545,819 | 12/1970 | Gaffney et al. | 303/21 R |
| 3,597,011 | 8/1971 | Clifford | 303/21 BE |
| 3,545,817 | 12/1970 | Yarber | 303/21 P |
| 3,245,727 | 4/1966 | Anderson et al. | 303/21 EB |
| 3,017,145 | 1/1962 | Yarber | 303/21 P |
| 3,467,444 | 9/1969 | Leiber | 303/21 BE |
| 3,556,614 | 1/1971 | Steigerwald | 303/21 CG |

Primary Examiner—Milton Buchler
Assistant Examiner—Stephen G. Kunin
Attorney—F. W. Brunner, P. E. Milliken and Oldham & Oldham

[57] ABSTRACT

A skid detecting circuit for use in a brake control system which has two outputs, the first of which is produced whenever a slight skid occurs and is applied to the modulator section of the brake control circuit to provide a slight reduction in brake pressure. The second output is produced only when a major skid occurs and is applied directly to the amplifier of the brake valve control circuit to cause rapid dumping of the brake pressure. The circuit employs a pair of amplifiers connected in a balanced bridge network. One of the amplifiers is connected to a more sensitive point in the network and is thus responsive to any skid signal. The second amplifier is responsive only to skid indicating signals above a certain higher magnitude.

3 Claims, 3 Drawing Figures

INVENTOR
EDGAR J. RUOF
BY:
Oldham & Oldham

SKID DETECTOR CIRCUIT

This invention relates to skid detection circuits for use in vehicle brake control systems, and more particularly to an improved skid detecting circuit which is capable of distinguishing between a skid of low magnitude and one of greater magnitude.

There are various types of skid detecting circuits used with brake control systems of vehicles for control of braking action to provide vehicle stopping in the shortest possible distance. However, the detection systems heretofore employed are incapable of distinguishing the magnitude or depth of the skid and, as a result, cause a dumping of brake pressure even when the skid is minor. This dumping is undesirable when only a minor skid occurs as it causes greater reduction of brake pressure than is necessary to correct the skid. Preferably, the brake pressure should be reduced only by an amount sufficient to end the skid so that the time required to restore braking pressure is kept to a minimum.

It is the primary object of the present invention to provide an improved skid detector circuit for use in a brake control system which is capable of distinguishing between a minor and major skid and of producing separate output signals related to the magnitude of the skid.

The objects of the invention are achieved by providing a skid detection circuit which is comprised of a normally balanced electrical circuit including a pair of amplifiers, the first of which is connected at a more sensitive point of the circuit than is the second. The balanced circuit becomes unbalanced on skidding deceleration of the wheel and the first amplifier is responsive to the unbalanced condition of the circuit. The second amplifier is responsive only when the unbalanced condition exceeds a predetermined greater magnitude.

For a more complete understanding of the invention reference should be had to the following specification and the accompanying drawings wherein there is shown a preferred embodiment of the invention.

Figure 1:
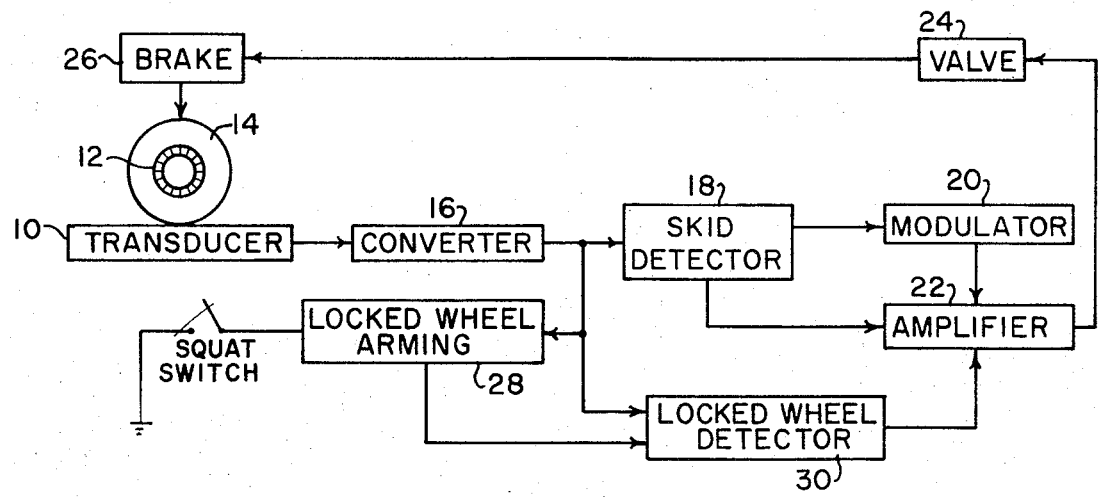
FIG. 1 is a block diagram showing the components of a brake control system utilizing the skid detector circuit of the present invention.

The brake control circuit may be of the type shown in U.S. Pat. No. 3,582,151 or No. 3,556,614, and includes a transducer 10 and exciter ring 12 which produce a pulsating electrical signal corresponding to the rotational speed of the aircraft wheel 14. The signal produced by the transducer 10 is supplied to a converter 16 which produces a DC voltage signal proportional to wheel speed. The output of the converter 16 is supplied to a skid detector 18, described in detail below, which detects a skid as an increase of deceleration beyond the predetermined level. The skid detector has two outputs, the first being supplied to a modulator 20 and the second to an amplifier 22, As will be described below, the signal from the detector 18 to the modulator 20 is present whenever a skid is detected. This signal to the modulator causes an increase in the modulator signal and a partial reduction in brake pressure. The signal to the amplifier 22 directly from the skid detector 18 is produced only when the skid is beyond a predetermined level and this signal causes the valve 24 to rapidly dump the brake pressure. The circuit may also include a locked wheel arming portion 28 and a locked wheel detector portion 30.

Figure 2:
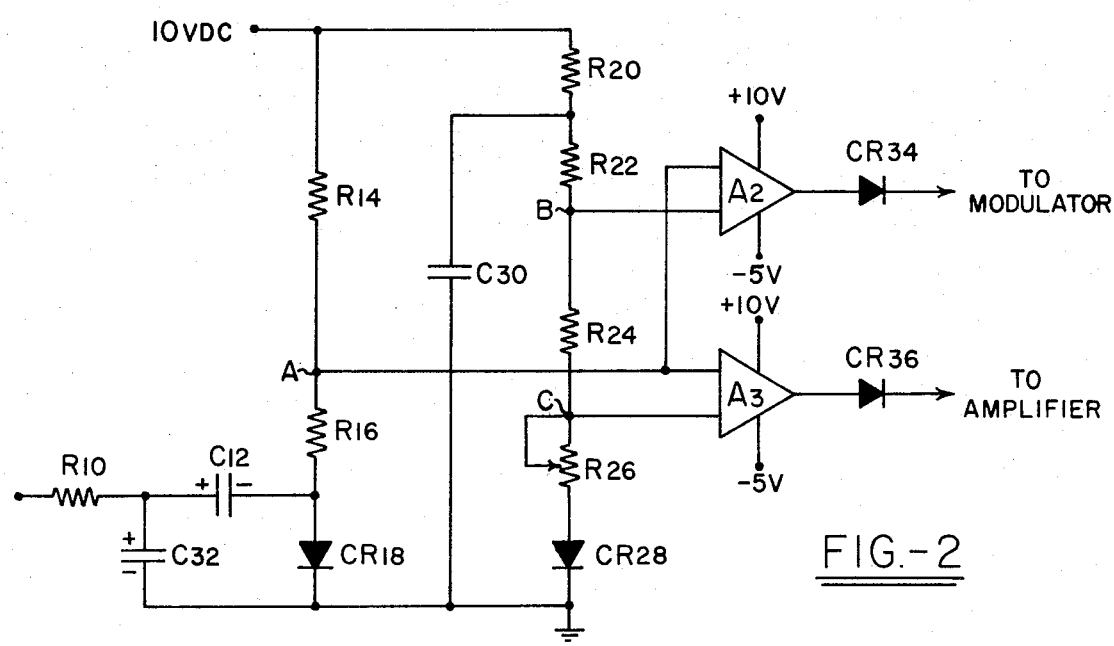
FIG. 2 is an electrical schematic diagram of the skid detector circuit portion of the control diagram of FIG. 1.

The skid detector circuit 18 is shown in more detail in FIG. 2. The circuit has two legs connected from a suitable power supply to ground. The supply might be 10 volts DC, for example. One of the legs includes the resistors R20–R26 and diode CR 28. A pair of operational amplifiers A2 and A3 have a common connection at the point A between R14 and R16 of the first leg of the circuit. The amplifiers are common components such as an LH101 as sold by National Semi-Conductor Company. The amplifier A2 is also connected to the second leg at a point B between R22 and R24. The amplifier A3 is connected to the second leg at a point C between R24 and R26. The amplifiers connected in this manner set up a bridge balance between the two legs of the circuit. The amplifiers quiescently have a negative voltage at their output terminals. A skid condition unbalances the bridge and thus causes the output to become positive. The legs defining the bridge provide a balance between the voltages picked off at B and C and A. The voltage at A decreases as wheel deceleration increases.

The DC voltage from the converter is applied to the control capacitor C12, the resistor R10 and capacitor 32 forming a filter to remove unwanted ripple voltages from the DC input.

When the converter becomes energized after touchdown, and if no skid occurs, the DC output from the converter gradually decreases and C12 gradually discharges, the discharge current being taken from the steady-state current that normally flows through R14, R16 and CR 18. The current drawn by the discharge of C12 is insufficient to unbalance the circuit. As a result, A2 and A3 remain quiescent with negative output signals present at each of their output terminals. When a skid occurs, the DC voltage from the converter drops by a proportional amount and the capacitor C12 discharges more rapidly. As a result, the circuit is unbalanced and the output of amplifier A2 becomes positive producing a signal through the diode CR34. The resistor R24 is of such value that A2 will operate at a lower voltage than will A3. Thus, if the DC output from the converter drops a sufficient amount to indicate a skid but does not drop rapidly enough to indicate a skidding situation in which complete dumping of the brakes is desired, the rate of discharge of C12 will be sufficient to unbalance the circuit to the point where A2 operates but not sufficiently to cause A3 to operate. As a result, a signal is present through the diode CR34 to the modulator circuit but no signal is present through the diode CR36. As a result, the braking circuit is controlled by the modulator circuit. In the event of rapid discharge of C12 the circuit becomes sufficiently unbalanced that the output of A3 also becomes positive producing a signal through CR36 which signal is fed to the amplifier causing the dumping of the brakes. The voltage drop between the level causing A2 to conduct and the level causing A3 to conduct is determined by the valve of R24. Preferably, this voltage drop is approximately 0.20V.

Figure 3:
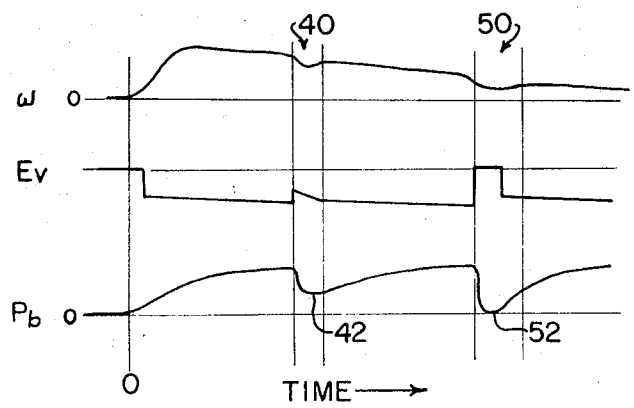
FIG. 3 is a graphic showing of the relationship between wheel velocity, the brake valve control signal, and the brake pressure.

The operation of the skid detector circuit and the associated brake control circuitry will now be described with particular reference to FIGS. 2 and 3. In FIG. 3 the upper most line represents the aircraft wheel rotational velocity $\omega$. At time $T=0$, the rotational velocity equals zero, this represents the condition prior to touchdown. As soon as touchdown occurs, $\omega$ increases rapidly and then gradually decreases under the effects of the braking action. The intermediate line represents the control signal from the amplifier 22 to the valve 24 and the lower most line represents the brake pressure as controlled by the valve 24. At touchdown, the valve control signal $E_v$ is at a maximum, causing a complete dumping of the brake pressure so that the wheels may freely rotate during the initial portion of touchdown. The control signal $E_v$ drops to a lower level as soon as the wheels have begun rotating and as a result the brake pressure $P_b$ rises. The modulator circuit 20 causes a gradual further decrease in the signal $E_v$, so that the brake pressure $P_b$ continues to increase gradually, effecting a smooth increase in the deceleration of the aircraft. The zone 40 indicates a skid of relatively low magnitude as seen by the slight drop in wheel velocity $\omega$. This drop of wheel speed produces a sufficient rate of change in the signal from the converter 16 to cause C12 to gradually discharge unbalancing the skid detector circuit to the point at which A2 operates but not sufficiently to cause A3 to also produce an output signal. The valve control voltage $E_v$ is thus increased due to the input signal to the modulator 20 and the brake pressure $P_b$ is decreased as indicated at 42. The skid indicated in the zone 40 is sufficiently small that the decrease in brake pressure effected by the modulator circuit is sufficient to correct the skid. As a result, the skid detector circuit returns to a balanced state and the control voltage $E_v$ is returned to approximately the same level as before the skid occurs allowing the brake pressure to again gradually increase. The zone 50 indicates a skid of major proportions. This skid is sufficient to produce a rapid decrease in the value of the signal from the converter 16 with the resultant rapid discharge of the capacitor C12. The detector circuit now becomes sufficiently unbalanced that amplifiers A2 and A3 are both switched on. As a result a signal is produced through CR36 directly to the amplifier 22 and dumping of the brake pressure occurs, as indicated at 52.

It will be understood that while in accordance with the patent statutes only one embodiment of the invention has been described, the invention is not so limited. Reference should therefore be had to the appended claims in determining the true scope of the invention.

What is claimed is:

1. An anti-skid braking system, comprising:
   a rotatable wheel;
   means to supply hydraulic braking pressure to the wheel;
   electrically proportional valve means to adjustably restrict the hydraulic pressure actually applied to the wheels;
   means to represent wheel rotation as an electrical signal;
   a bridge circuit having one side connected to a constant voltage source and the other side connected to the last mentioned means so as to receive the electrical signal;
   first and second switching amplifiers connected across the legs of the bridge, the first amplifier producing a first signal when unbalance occurs due to a skid below a predetermined magnitude, and the second amplifier producing a second signal when unbalance occurs due to a skid above a predetermined magnitude;
   a modulator circuit receiving the first signal from the first amplifier and producing an output signal; and
   a third amplifier receiving the second signal from the second amplifier and the output signal from the modulator circuit, the third amplifier controlling the valve means so as to produce a modulated reduction in hydraulic pressure proportional to the first signal when only the first signal is present and to produce a full dump of hydraulic pressure to the valve means when the second signal is present.

2. An anti-skid braking system according to claim 1 wherein the first and second amplifiers have a common connection to one leg of the bridge, the first amplifier being connected to the other leg of the bridge at a first point, the second amplifier being connected to the other leg at a second point, the other leg including a resistor between the first and second points.

3. A braking system according to claim 2 which further includes a variable resistor to affect preselection of the point of unbalance of the bridge at which the second switching amplifier produces the second signal.

* * * * *